Oct. 13, 1959 R. GOERLICH 2,908,278

FILE RECORD SELECTION ARRANGEMENT

Filed Sept. 13, 1956 3 Sheets-Sheet 1

Inventor:
R. GOERLICH

BY Robert Harding Jr.
ATTORNEY

Oct. 13, 1959 R. GOERLICH 2,908,278

FILE RECORD SELECTION ARRANGEMENT

Filed Sept. 13, 1956 3 Sheets-Sheet 2

Inventor:

R. GOERLICH

BY Robert T. Harding Jr.

ATTORNEY

Oct. 13, 1959

R. GOERLICH 2,908,278

FILE RECORD SELECTION ARRANGEMENT

Filed Sept. 13, 1956

3 Sheets-Sheet 3

INVENTOR

R. GOERLICH

BY Albert Reis

ATTORNEY

United States Patent Office
2,908,278
Patented Oct. 13, 1959

2,908,278

FILE RECORD SELECTION ARRANGEMENT

Reinhard Goerlich, Berlin-Schoneberg, Germany, assignor to International Standard Electric Corporation, New York, N.Y., a corporation of Delaware Application September 13, 1956, Serial No. 609,749
Claims priority, application Germany September 22, 1955
8 Claims. (Cl. 129—16.1)

This invention relates to improvements in record selection arrangement and more particularly to a system for selecting particular records from a central file of a plurality of similar records.

This invention finds use in card indices or registers wherein a particular card can be removed by means of a remote selection control system independent of its position in the file.

Record cards play an important part in modern business and their ready selection increases their usefulness. Cards may be used for the compilation of all sorts of bits of information such for instance, as records of payments made or received; or the several items reflecting the activity of a customer's account in the banking field, etc. In any event, the card must be furnished with indicia which identifies the card with a particular account, or person. In special cases the cards may be furnished with additional indicia such as punched holes, magnetic or other characteristic markings which serves to control the operation of a bookkeeping machine which can test or scan the characteristic markings and have its mechanism actuated in accordance with such markings.

A good card index should meet the following requirements: it must be possible to quickly extract any desired card from the index. Manual extraction of the cards should be avoided to prevent bending, mutilation or wear caused by the handling thereof. It should also be possible to select the cards from the central file from a remote point or remote points by dialing a number such as the arrangement used in automatic telephone systems or by providing an appropriate keyboard having a plurality of keys which may be actuated and cause the selection mechanism to cause the ejection of a particular card in accordance with the operated keys. The system should also provide for the conveyance of an ejected card to the remote station which called for its ejection and the system should also provide for a return to the file of the ejected card after its use and the card index should be capable of being expanded to any desired capacity without having to alter the original selected arrangement.

It is therefore an object of the invention to provide an arrangement for the selection of a desired record medium from a central file of same by electromagnetic means.

It is a further object of this invention to provide an arrangement for the selection of a desired card from a central file regardless of the position of that card within the file with respect to the other cards in the file.

It is still a further object of the invention to return a card to the file for storage.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
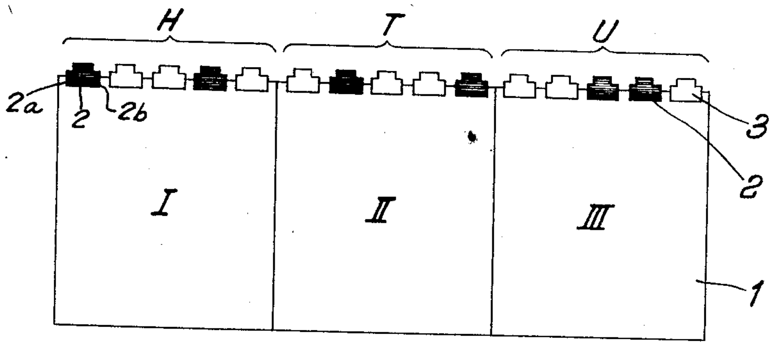
Fig. 1 is a schematic representation of a record card utilizing my invention.

Referring now to Fig. 1, there is shown diagrammatically a record card 1 which may have any suitable shape, but which for the purposes of exposition, is presumed to have a rectangular shape. The card 1 is shown divided into three sectors, I, II and III. Along the upper edge of the card there is provided a row of spaced indicia elements, 2, 3, the elements 2 being made of a ferro-magnetic material and the elements 3 being made of a non-magnetic material. The elements 2, 3 are provided however, with the same profile which has been shown here to be in the form of an inverted T. The elements 2, 3 will be seen to comprise three groups of five each along the edge of the card 1, each of which groups have been labelled H, T and U representing the hundreds, tens and units digits in a three digital decimal arrangement. It will be seen that of each group of five elements, 2, 3, two of the elements are magnetic and three thereof are non-magnetic. It will be apparent to those skilled in the art that the elements 2, 3 may be combined to form a code and for each grouping H, T and U, ten possible combinations may be realised per group giving in all, $10^3$ possible combinations. By providing a further group in addition to the H, T and U groups, $10^4$ possibilities may be achieved.

Figure 2:
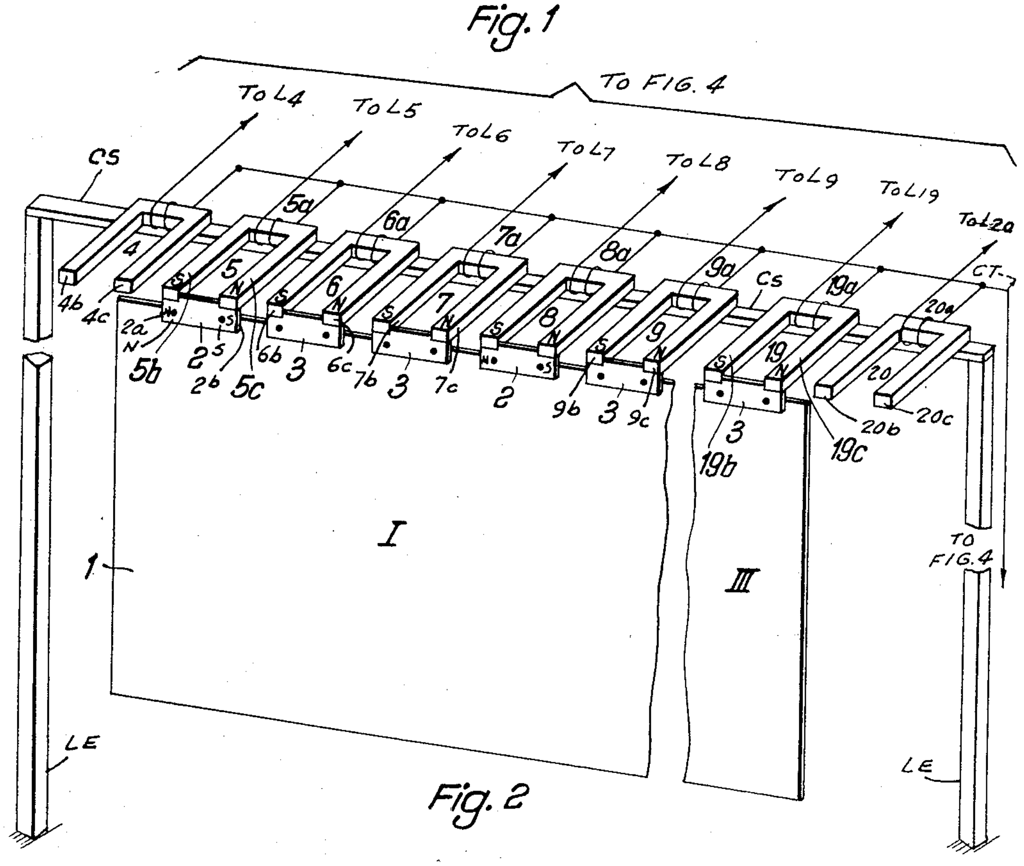
Fig. 2 is a diagrammatic representation showing the method of suspending a record card in a central file according to the invention.

In Fig. 2 the suspension of the record cards 1 is achieved by the use of a plurality of fixed magnetizable yokes 5 . . . 19 each having its associated winding *4a* . . . *20a* and its parallel legs *5b*, *5c* . . . *19b*, *19c*, respectively. The yokes 4 . . . 20 are supported in the position shown by a frame which consists of a cross-support CS and vertical legs LE. The U-shaped portion of each yoke is fastened to the support CS by a rivet or other suitable fastening means. Opposite ends of the support are carried by vertical legs LE whose length is greater than the smaller dimension of the side of a card 1. The spacing between the legs *5b*, *5c* . . . *19b*, *19c*, is such that the inverted T portions of the several elements 2, 3, fit complementarily between such legs *5b*, *5c* . . . *19b*, *19c*, as shown in Fig. 2. It should be understood that the legs of said yokes are long enough to receive as many cards as will be required to be stored in the file. A side view of a number of stored cards may be seen in Fig. 3. The arrangement utilized permits the cards 1 to be supported solely by the magnetic attraction of the elements 2 with the yokes 5 . . . 19 which extend transversely thereof. The yokes 5 . . . 19 extend in a row, as shown in Fig. 2, and at the outer ends of the row are additional yokes 4 and 20, respectively. These additional yokes are used in connection with the extraction from the file of those records whose outer indicia elements are of the ferro-magnetic type 2. Further explanation of the function of the yokes 4 and 20 will be made later. The placement of the several cards 1 in the file requires that the several ferro-magnetic elements 2 of such cards are magnetized. This initial pre-magnetization may be achieved by energizing the windings *5a* . . . *19a* simultaneously, whilst the cards 1 are brought into contact with the yokes. In this connection the structure in Fig. 3 discloses one method of placing the cards 1 into random position in the file. This energization of the yokes 4 through 20 may be achieved by the circuitry shown schematically in Fig. 4. It will be seen in Fig. 4 that the actuation of the key E will close a circuit between the potential source B and each of the windings 4a . . . 20a, via the common bus CT, which bus is connected, respectively, to the terminals t4 . . . t20 associated with the windings 4a . . . 20a, respectively.

As previously stated the placement of a card with its elements 2, 3 in proximity of the enrgized bars 5b, 5c . . . 19b, 19c will cause the elements 2 thereof to be magnetized. Upon release of the key E and the removal of current from the magnetizing windings 5a . . . 19a, the remanent magnetization of the elements 2 will cause such elements to cling to their associated bars against the pull of gravity and the card will thereby be retained in suspended position in the file. It will be understood that the cards may be placed in random position in the file with respect to the coding, the requirement being that the elements 2 and 3 fit complementarily between the bars of the yokes with which they are associated.

To extract the desired card from the file my invention contemplates the energization of those yokes which are adjacent the magnetized elements 2 of a desired card. As shown in Fig. 2, the elements 2 of the card acquire north and south polarities in the ends 2a and 2b, as shown. As will be further seen from Fig. 2, all the legs 4b . . . 20b of the yokes are initially polarized in a southerly magnetic direction, whereas the legs 4c . . . 20c thereof are polarized in the northerly direction. Taking left-hand element 2 of the card 1, in Fig. 2, it will be seen that the portion 2a has a northerly polarity, and from what has been said previously, the energization of the yoke 4 will cause the leg 4c thereof to assume a northerly polarity. A repelling effect will thus be exerted on the element 2 when the winding 4a is energized, and if the winding 6a is energized the leg 6b will develop a south polarity which will in similar manner repel the end 2b of the element 2, thus overcoming any remanent attraction which such element 2 has to bars 5b and 5c.

The card shown in Fig. 1 when maintained in the file, as shown in Fig. 2, has its first, fourth, seventh, tenth, thirteenth and fourteenth indicia elements (reading from left to right) in magnetic attraction with the yokes 5, 8, 11, 14, 17 and 18. To extract this card from the file, therefore, it is necessary to energize the yokes adjacent the last mentioned yokes, namely, yokes 4, 6, 7, 9, 10, 12, 13, 15, 16 and 19. This selective energization is achieved by the operation of key K in Fig. 4. Key K, by means of its contacts 1 . . . 10, is connected to leads L4, L6, L7, L9, L10, L12, L13, L15, L16 and L19, and complete energizing circuits for the windings 4a, 6a, 7a, 9a, 10a, 12a, 13a, 15a, 16a and 19a over common bus CT to potential source B. From what has been stated previously, the card 1 will drop from the yokes, due to the pull of gravity, and a selection will have been completed. It will be appreciated that the key K controls the release of but a single card whose code grouping corresponds to the card 1 in Fig. 1. It will be understood that there are other keys (not shown) to control the release of other cards having different code groupings. Multiple arrows M schematically indicate the circuit to such other keys. All cards 1, other than the selected card, will remain in their suspended position from yokes 5 . . . 19.

It will be understood that the lines L4 . . . L20 may extend to other locations so that the release of cards from the file may be controlled from as many locations as is desired. Since no two cards have the same code grouping all cards other than the selected cards will remain suspended in position from the bars due to the remanent magnetization of their several ferromagnetic elements.

Figure 3:
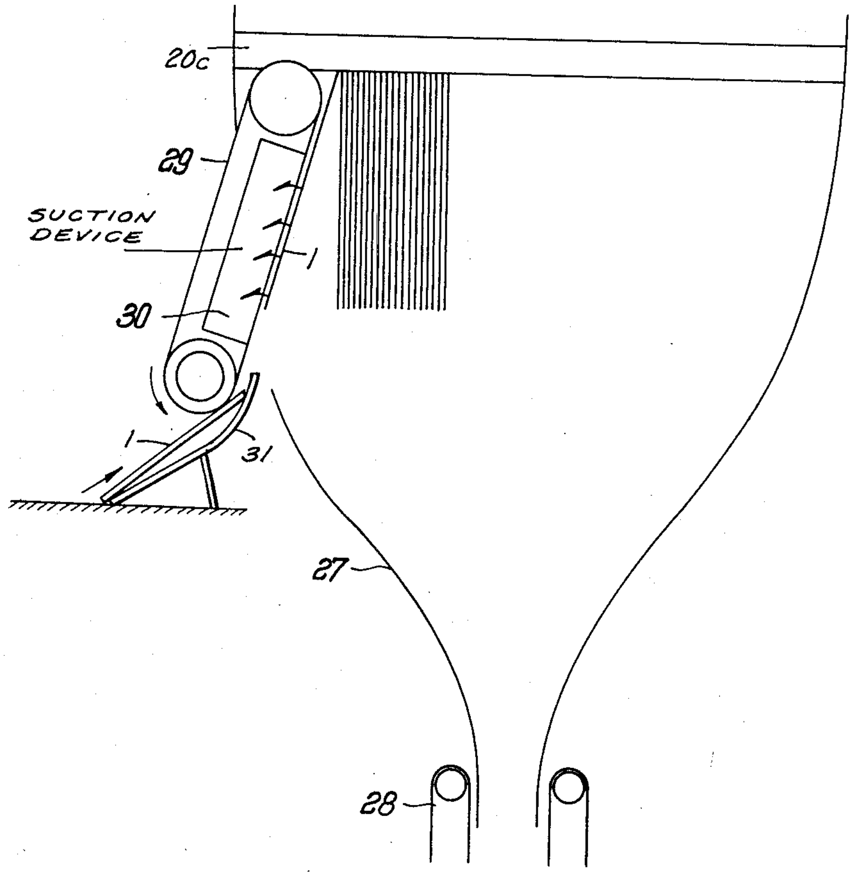
Fig. 3 is a diagrammatic representation of a side view of the card index according to the invention including a conveyor for returning cards to the file as well as a conveyor for delivering ejected cards from said file.
Figure 4:
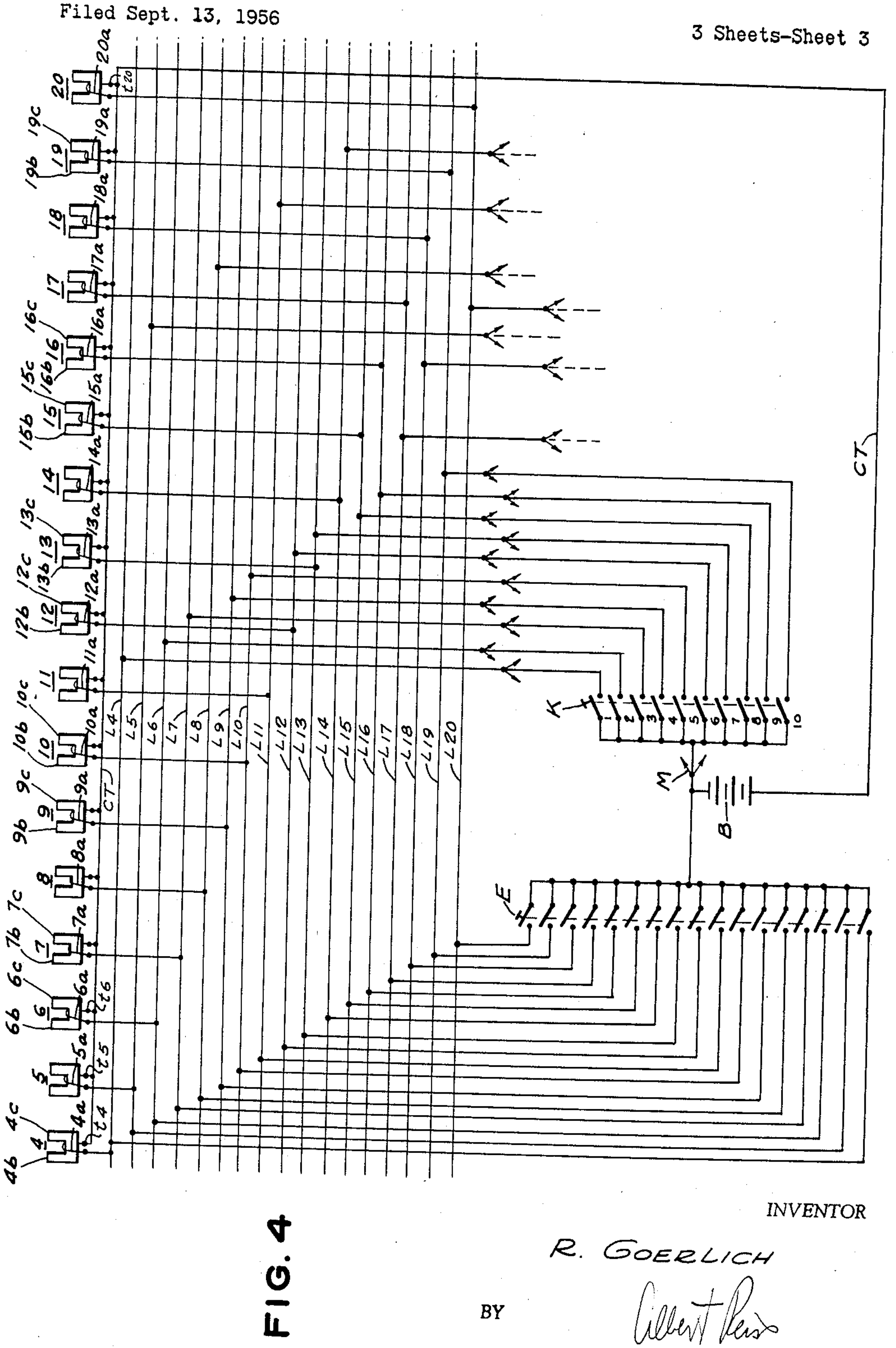
Fig. 4 is a schematic electrical circuit diagram of a selection system for selectively ejecting the card shown in Fig. 1 from the file.

In Fig. 3 it may be seen how any card which is ejected from the file may be directed by means of the funnel shaped element 27 to the conveyor belt 28, thereby to be transported to any desired remote point. Such conveyor means are well-known to the art and are considered no part of this invention. In order to return the cards 1 to the file, there is provided a second belt 29 which has associated therewith a suction device 30 constituted on the inside run of the belt and which is adapted to hold a card 1 against the outside surface of the belt 29 thereby to return a card to the devices 5 . . . 19 which are all now presumed to be energized and thereby cause magnetic attraction between the elements 2 and the card 1 which is being transported by the belt 29. Cards destined for the file may be brought in proximity to the belt 29 and the suction device 30 by any suitable known means including the fixed slide 31 which is positioned adjacent the lower portion of the belt 29 and by means of which a card may be urged by an external force indicated by the arrow until the card is drawn against the belt by the suction device and then carried up to the yokes as schematically shown in the drawing.

The provision of the yokes 4 and 20 will enable the remanent magnetism to be overcome of an element 2 which is at the extreme left hand side or the extreme right hand side of a card 1.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An arrangement for the selection of a particular record from a random file of like records comprising, in combination, a spaced row of fixed ferromagnetic bar means, separate winding means associated with said bar means, means to initially energize each of said winding means, simultaneously, and means to thereafter selectively energize predetermined of said windings in a code combination; each of said records comprising a record medium having a spaced row of indicia elements disposed along a surface thereof, the spacing between adjacent elements corresponding to the spacing between adjacent of said bar means, an invariable number of said elements being of ferromagnetic material and the balance of said elements being of non-magnetic material, said ferromagnetic elements being positioned differently in the element rows of respective of said records to form predetermined code combinations, means for randomly placing said records into operative contact with said bar means so that the surfaces carrying said indicia are transverse to the row of said bar means and each element of said record media is in register with a different one of said bar means, the characteristics of said ferromagnetic elements being such that they retain magnetic remanence after the initial energization of said winding means, and remain suspended from said bar means against the pull of gravity, said media adapted to be selectively dropped from said bars upon the selective energization of the winding means associated with the bar means adjacent the bar means with which each ferromagnetic element is in register, the flux generated by said energized windings being sufficient to overcome said magnetic remanence.

2. An arrangement as claimed in claim 1, wherein said magnetic elements are spaced distances which are multiples of the distance between adjacent bar means.

3. An arrangement as claimed in claim 1, wherein each of said bar means comprises a pair of magnetic yokes extending in parallel planes in said row, each pair of said yokes interconnected magnetically, said winding means comprising a plurality of coil windings, each winding cooperating with a different pair of interconnected yokes.

4. An arrangement as claimed in claim 3, wherein said yokes have a profile which is complementary to the profile of the indicia elements on said media.

5. An arrangement as claimed in claim 3, wherein a leg of each yoke pair is separated from the opposite leg of the adjacent yoke pair a distance sufficiently small to permit fluxes developed in a pair of yokes to magnetically repel a magnetic element attracted to an adjacent yoke leg.

6. An arrangement as claimed in claim 1, wherein said means for selectively energizing said windings comprises a source of energizing potential a key set wired intermediate said source and predetermined of said windings in said combination code.

7. An arrangement as claimed in claim 1, wherein said means for selectively energizing said windings comprises a source of energizing potential, a plurality of key sets interconnected in parallel intermediate said source and said predetermined windings in said combination code, each set remote from said file and from each other.

8. An arrangement as claimed in claim 1 wherein said means to initially energize each of said winding means comprises a source of energizing potential and switch means coupled intermediate said windings and said source.

References Cited in the file of this patent

UNITED STATES PATENTS

| | | |
|---|---|---|
| 1,925,705 | Robinson | Sept. 5, 1933 |
| 2,181,539 | Wertz | Nov. 28, 1939 |
| 2,269,767 | Jayne | Jan. 13, 1942 |